Dec. 25, 1962  W. G. MILLER ETAL  3,069,780
SHAVER ARCH GAGE
Filed Jan. 7, 1960

INVENTORS
Wilbur G. Miller &
Theodore R. McKenzie

BY  *Fidelman & Lavine*

ATTORNEYS

United States Patent Office 3,069,780
Patented Dec. 25, 1962

3,069,780
SHAVER ARCH GAGE
Wilbur G. Miller, 3640 Gallatin St., Hyattsville, Md., and Theodore R. McKenzie, Deale, Md. (10209 Proctor St., Silver Spring, Md.)
Filed Jan. 7, 1960, Ser. No. 1,006
11 Claims. (Cl. 33—185)

The present invention relates to a shaver arch gage, and more particularly to a gage adapted to be fitted onto the knife of a stereotype curve plate shaver and to measure the distance between the knife edge and the arch of the shaver by the movement of a lever which is transmitted to an indicating device.

In the printing of newspapers and the like, stereotype plates are widely used where a pictorial representation is desired. These stereotype plates are prepared in known manner, and are semi-cylindrical in form, so that they may be placed upon a cylinder of a printing press. It has been found, in the use of these stereotype plates, that they must be of a precise and uniform thickness throughout, in order that the printing impression obtained therefrom may be of uniform quality.

In the past, there has been provided a device known as a stereotype curve plate shaver, the primary parts of which were a block having a recess of generally semi-circular configuration together with a pivoted carrier and blade that were mounted for movement concentrically within the recess. In use, the curved stereotype plate was placed in the recess of the arch, and the carrier was pivoted about its axis, so that it oscillated in the arch, carrying the blade with it. The blade is adjustably positioned on the carrier and the position of the blade radially outwardly from the pivotal axis is determined by a feeler gage and held by suitable locking means.

Even with the use of the stereotype curve plate shaver as described, the obtaining of stereotype plates of uniformly accurate thickness was at best a time-consuming, tedious and expensive operation, requiring from two to four men.

An object of the present invention is to provide a gage for use in setting the blade of a stereotype curve plate shaver.

Another object of the present invention is the provision of a gage for determining the space between parts of a machine, such as a stereotype curve plate shaver.

A further object of the present invention is to provide a gage that includes an indicator having an axially movable spindle, which gage will protectively enclose the spindle of the indicator.

A still further object of the present invention is the provision of a gage that is economical to manufacture and of rugged and durable construction.

Other objects and the nature and advantages of the instant invention will be apparent from the following description taken in conjunction with the accompanying drawings, wherein.

Figure 1:
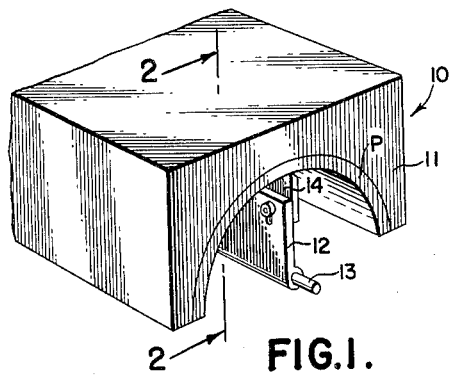
FIG. 1 is a perspective view of a stereotype curve plate shaver, with a stereotype plate in place therein.

Referring now to the drawings, wherein like or corresponding reference characters are used to designate like or corresponding parts throughout the several views, there may be seen in FIG. 1 a stereotype curve plate shaver 10, comprising the arch 11, the carrier 12, spindle shaft 13, and knife 14. The shaft 13 is rotatably supported and is concentric with the semi-circular recess in the arch 11. It is in the recess of arch 11 that the stereotype plate P is positioned so that its reverse or non-printing surface may be shaved by the knife 14. Suitable means, not shown, are provided to rotate the shaft 13 to effect shaving of the plate P by means of the knife 14.

Figure 2:
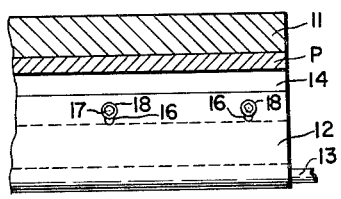
FIG. 2 is a cross-sectional view taken on the line 2—2 of FIG. 1.

As may be seen in FIG. 2, the carrier 12 is provided with suitable means to adjustably hold the knife 14, there being, for example, a plurality of slots 16 extending radially of the axis of shaft 13. Screw-threaded fasteners 17 extend through the carrier 12, and may be secured by the nuts 18. Thus, by loosening the nuts 18, the knife 14 may be adjusted relatively to the carrier 12 so as to be closer to or further from the arch 11.

Figure 3:
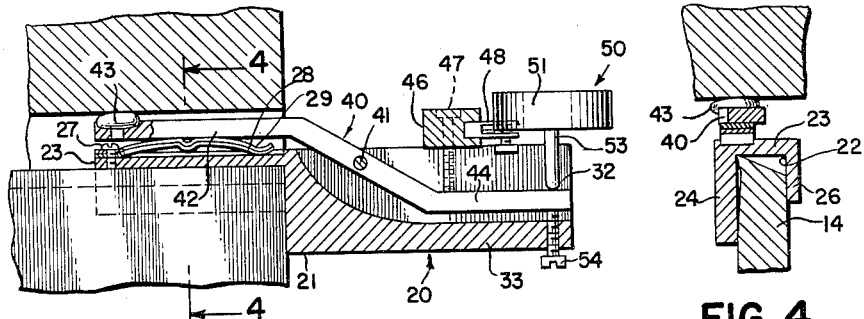
FIG. 3 is a vertical cross-sectional view showing a shaver arch gage in accordance with the present invention being used with the stereotype plate shaver of FIG. 1.
Figure 4:
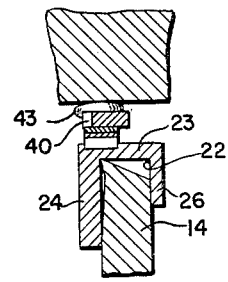
FIG. 4 is a cross-sectional view taken on the line 4—4 of FIG. 3.
Figure 5:
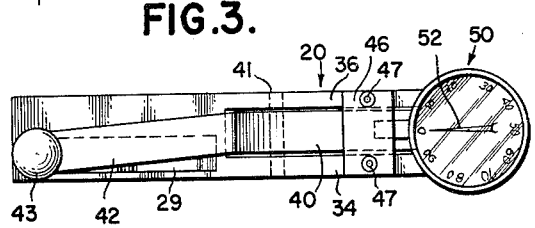
FIG. 5 is a plan view of the shaver arch gage of FIG. 3.

As will be seen from FIGS. 3, 4 and 5, the shaver arch gage 20 has an elongate gage body 21. Body 21 has at one end thereof, the left end as shown in FIG. 3, a downwardly facing chamber 22 (see also FIG. 4) defined by an upper wall 23 and two spaced side walls 24 and 26 depending therefrom in parallel relationship. The walls 24 and 26 are spaced sufficiently to receive in the chamber 22 defined thereby the knife 14 of the stereotype curve plate shaver 10. On the upper side of upper wall 23 there is secured, as by screw 27, a pair of superposed bowed leaf springs 28, 29.

At the opposite end from the downwardly facing chamber 22, the gage body 21 has an upwardly facing chamber 32 defined by a bottom wall 33 and two upwardly extending parallel side walls 34 and 36.

A lever 40 is pivoted to the gage body 21 by a pivot pin 41 that extends through the walls 34 and 36. Lever 40 has a first arm 42 that extends over the upper wall 23, arm 42 carrying an engagement member 43 on the upper side thereof near its outer end. Engagement member 43 is of a relatively hard material and has a rounded or spherical upper surface. Arm 42 may have an engagement portion which is integral, rather than a separate engagement member 43. A second arm 44, of length equal to arm 42, extends at a lower level than the first arm 42 and may be seen to be in the chamber 32 above the bottom wall 33 and between the side walls 34 and 36. Due to the inclination of arm 42, as is best seen in FIG. 5, the engagement member 43 is not in the vertical median plane of gage body 21. The center of the member 43 thereby overlies the cutting edge of knife 14, as is shown in FIG. 4.

A support block 46 is secured on the upper surfaces of the walls 34 and 36, as by screws 47. Extending from support block 46 is a bar 48 that is split at its outer end so as to form two fingers, one of which is inserted into the casing 51 of an indicator 50. Indicator 50 is of a known type, having a rotatable needle 52 that is moved in response to axial movement of the spindle 53 of indicator 50. A stop screw 54 is provided, screw 54 being threaded through the bottom wall 33 and serving to limit the movement of lever 40.

Figure 6:
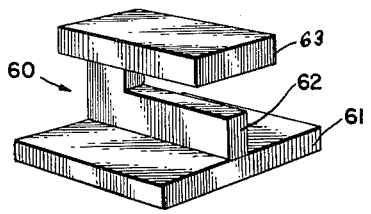
FIG. 6 is a perspective view of a master gage block provided for use with the shaver arch gage of the present invention.

There is preferably provided, for use with the shaver arch gage 20, a gage block 60, block 60 having, as may be seen in FIG. 6, a base 61, a bar 62 thereabove and a head 63. The distance between the under side of head 63 and the upper surface of bar 62 is equal to the desired thickness of the stereotype plate P.

Figure 7:
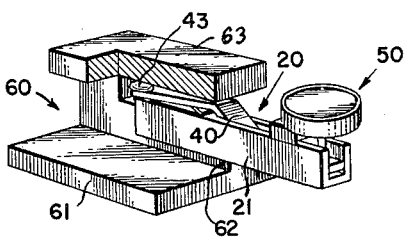
FIG. 7 is a perspective view showing the shaver arch gage of the present invention being used with the master gage block of FIG. 6.

In use, the shaver arch gage is positioned on the bar 62 of the gage block 60, in the manner shown in FIG. 7.

The chamber 22 of gage body 21 rests upon the upper surface of the bar 62, and the engagement member 43 engages with the under surface of the head 63, being urged thereagainst by the leaf springs 28, 29. There is thereby established a definite position for the lever 40. The second arm 44 of lever 40 bears against the free end of spindle 53 of indicator 50, and so indicator 50 will indicate the position of lever 40. In practice, indicator 50 is so constructed that the dial thereof may be rotated relatively to the other parts thereof, so that the dial may thereby be set to zero. The shaver arch gage 20 is then removed from gage block 60, and is placed upon the knife 14 in the manner illustrated in FIGS. 3 and 4, i.e., with the knife 14 extending into the chamber 22. By manipulation of the securing means 17, 18, the knife 14 may be adjusted upon the carrier 12 until a proper reading is given by the indicator 50. More particularly, the knife 14 may be adjusted until the needle 52 of indicator 50 reads zero, thus indicating that the cutting edge of knife 14 is spaced the exact desired distance from the surface of the recess of arch 11. Thereafter, the stereotype plate P may be placed in position and shaved to the exact desired uniform thickness by the accurately positioned knife 14.

It will be understood that the adjustment of the knife 14 and the shaving of the plate P may, in certain circumstances, take place in a number of successive steps. Also, the shaver arch gage 20 will be used at the two ends of the knife 14 simultaneously, and for that purpose the exact configuration of the gage 20 which is shown on the attached drawings may be suitably modified.

It will be obvious to those skilled in the art that various changes may be made without departing from the spirit of the invention and therefore the invention is not limited to what is shown in the drawings and described in the specification but only as indicated in the appended claims.

What is claimed is:

1. A shaver arch gage for setting the knife of a stereotype curve plate shaver comprising an elongate gage body, said body having a downwardly facing chamber at one end defined by an upper wall and two parallel spaced side walls depending therefrom, said body having an upwardly facing chamber at the other end defined by a bottom wall and two upwardly extending side walls, a lever pivoted about an intermediate point to said body and having a first arm extending over the said upper wall and a second arm extending above said bottom wall and between the two side walls extending from said bottom wall, leaf spring means secured to the upper side of said upper wall and in underlying contact with the underside of the first arm of said lever to urge said first arm upwardly, an engagement member carried by said lever first arm on the upper side of the outer end thereof, an indicating means having a spindle extending therefrom, and means securing said indicating means to said gage body with said spindle in juxtaposition with the upper side of the second arm of said lever and between said two side walls of said upwardly facing chamber.

2. A shaver arch gage for setting the knife of a stereotype curve plate shaver comprising an elongate gage body, said body having a downwardly facing chamber at one end defined by an upper wall and two spaced side walls depending therefrom, said body having an upwardly facing chamber at the other end defined by a bottom wall and two upwardly extending parallel side walls, a lever pivoted about an intermediate point to said body and having a first arm extending over the said upper wall and a second arm extending above said bottom wall and between the two side walls extending from said bottom wall, spring means for urging said first arm upwardly, an engagement member carried by said lever first arm on the upper side of the outer end thereof, an indicating means having a spindle extending therefrom, and means securing said indicating means to said gage body with said spindle in juxtaposition with the upper side of the second arm of said lever.

3. A shaver arch gage for setting the knife of a stereotype curve plate shaver comprising an elongate gage body, said body having means at one end for receiving a knife, said body having an upwardly facing chamber at the other end defined by a bottom wall and two upwardly extending parallel side walls, a lever pivoted about an intermediate point to said body and having a first arm extending over the said means and a second arm extending above said bottom wall and between the two side walls extending from said bottom wall, spring means for urging said first arm upwardly, an engagement member carried by said lever first arm on the upper side of the outer end thereof, an indicating means having a spindle extending therefrom, and means securing said indicating means to said gage body with said spindle in juxtaposition with the upper side of the second arm of said lever.

4. A shaver arch gage for setting the knife of a stereotype curve plate shaver comprising an elongate gage body, said body having means at one end for receiving a knife, said body having an upwardly facing chamber at the other end, a lever pivoted about an intermediate point to said body and having a first arm extending over the said means and a second arm in said chamber, spring means for urging said first arm upwardly, an engagement member carried by said lever first arm on the upper side of the outer end thereof, an indicating means having a spindle extending therefrom, and means securing said indicating means to said gage body with said spindle in juxtaposition with the upper side of the second arm of said lever.

5. A shaver arch gage for setting the knife of a stereotype curve plate shaver comprising an elongate gage body, said body having means at one end for receiving a knife, said body having an upwardly facing chamber at the other end, a lever pivoted about an intermediate point to said body and having a first arm extending over the said means and a second arm in said chamber, spring means on said body for urging said first arm upwardly, an indicating means having a spindle extending therefrom, and means securing said indicating means to said gage body with said spindle in juxtaposition with the upper side of the second arm of said lever.

6. A shaver arch gage for setting the knife of a stereotype curve plate shaver comprising an elongate gage body, said body having means at one end for mounting said body on a stereotype plate shaver knife, said body having an upwardly facing chamber at the other end, a lever pivoted to said body and having means for engaging a shaver arch, one arm of said lever being in said chamber, spring means on said body for urging said lever so that said engaging means is pushed toward a shaver arch, an indicating means having a spindle extending therefrom, and means securing said indicating means to said gage body with said spindle in juxtaposition with said lever to thereby indicate the position of said lever.

7. A shaver arch gage for setting the knife of a stereotype curve plate shaver comprising an elongate gage body, said body having means at one end for mounting said body on a stereotype plate shaver knife of thin elongate shape, lever means, means pivotally securing said lever means to said body, means on said lever means for engaging a member spaced from said body, indicating means having a sensing member, and means securing said indicating means to said gage body with said sensing member in juxtaposition with said lever means to be moved thereby.

8. A shaver arch gage for setting the knife of a stereotype curve plate shaver comprising a gage body, said body having means for mounting said body on a thin, elongate knife, lever means, means for pivotally securing said lever means to said body, means on said lever means for engaging a member spaced from said body, indicating means having a sensing member and means securing said indicating means to said gage body with said sensing member in juxtaposition with said lever means to be moved thereby.

9. The gage of claim 8, and means for urging said engaging means away from said body.

10. The shaver arch gage of claim 1, said engagement member having a rounded upper surface, the highest part of which vertically overlies the portion of said downwardly facing chamber that receives the cutting edge of the knife of a stereotype curve plate shaver.

11. A shaver arch gage for setting the knife of a stereotype curve plate shaver comprising an elongate gage body, said body comprising means defining a downwardly facing chamber at one end for mounting said body on a stereotype plate shaver knife, lever means pivoted to said body and having a part thereof for engagement with a member spaced from said body, indicating means having a sensing member, and means securing said indicating means to said gage body with said sensing member in juxtaposition with said lever means to be moved thereby.

References Cited in the file of this patent

UNITED STATES PATENTS

| | | |
|---|---|---|
| 1,539,356 | Horstmann | May 26, 1925 |
| 2,043,613 | Hane | June 9, 1936 |
| 2,066,446 | Backmann | Jan. 5, 1937 |
| 2,468,395 | Fredin | Apr. 26, 1949 |

FOREIGN PATENTS

| | | |
|---|---|---|
| 928,852 | Germany | June 13, 1955 |